United States Patent
Hull

(10) Patent No.: US 6,848,311 B1
(45) Date of Patent: Feb. 1, 2005

(54) METHOD FOR ESTIMATING THE PROPERTIES OF A SOLID MATERIAL SUBJECTED TO COMPRESSIONAL FORCES

(75) Inventor: Andrew J. Hull, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/779,554

(22) Filed: Feb. 9, 2004

(51) Int. Cl.[7] .............................................. G01M 7/02
(52) U.S. Cl. ...................................... 73/579; 702/113
(58) Field of Search .......................... 73/579, 658, 659, 73/660, 662, 663; 702/56, 108, 113, 114, 115

(56) References Cited

U.S. PATENT DOCUMENTS

| | | | | |
|---|---|---|---|---|
| 3,842,662 A | * | 10/1974 | Key et al. ........................ | 73/584 |
| 3,901,074 A | * | 8/1975 | Douglas ........................ | 73/657 |
| 3,903,734 A | * | 9/1975 | Douglas ........................ | 73/579 |
| 4,383,450 A | * | 5/1983 | Pringiers et al. ............... | 73/790 |
| 4,445,381 A | * | 5/1984 | Russenberger ................ | 73/666 |
| 5,060,516 A | * | 10/1991 | Lau et al. ...................... | 73/602 |
| 5,269,181 A | * | 12/1993 | Gibson et al. ................. | 73/160 |
| 6,023,980 A | * | 2/2000 | Owen et al. ................... | 73/797 |
| 2002/0129660 A1 | * | 9/2002 | Hull .............................. | 73/789 |

* cited by examiner

Primary Examiner—Hezron Williams
Assistant Examiner—Rose M. Miller
(74) Attorney, Agent, or Firm—James M. Kasischke; Michael F. Oglo; Jean Paul A. Nasser

(57) ABSTRACT

A method to measure the complex frequency-dependent dilatational and shear wavenumbers of a material under a static compressional force. The material is first vibrated in a vertical and horizontal directions while obtaining transfer functions in each direction. The two transfer functions are combined with a theoretical model to estimate a dilatational wavenumber and a shear wavenumber. The wavenumbers can be utilized to give the complex dilatational wavespeed, complex shear wavespeed, complex Lamé constants, complex Young's modulus, complex shear modulus, and complex Poisson's ratio.

11 Claims, 11 Drawing Sheets

US 6,848,311 B1

METHOD FOR ESTIMATING THE PROPERTIES OF A SOLID MATERIAL SUBJECTED TO COMPRESSIONAL FORCES

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to a method to measure (or estimate) the complex frequency-dependent dilatational and shear wavenumbers of a single slab of material subjected to large static compressional forces. More particularly, this invention provides a method to determine complex dilatational wavespeed, complex shear wavespeed, complex Lamé constants, complex Young's modulus, complex shear modulus, and complex Poisson's ratio.

(2) Description of the Prior Art

Measuring the mechanical properties of slab-shaped materials are important because these parameters significantly contribute to the static and dynamic response of structures built with such materials. One characteristic that most elastomeric solids possess is that, when they are subjected to large static forces (or pressure), their rigidity changes. Materials that have one set of mechanical properties at a pressure of one atmosphere can have very different properties when subjected to increased pressure. The ability to determine the pressure dependence of material properties is extremely important for modeling the behavior of systems comprised of these materials.

Resonant techniques have been used to identify and measure longitudinal and shear properties for many years. These methods are based on comparing measured eigenvalues to modeled eigenvalues and calculating the resulting material properties. These methods do not account for static pressure or large compressive forces. Additionally, they typically require long, slender materials to perform the measurement process. Comparison of analytical models to measured frequency response functions are also used to estimate stiffness and loss parameters of a structure. When the analytical model agrees with one or more frequency response functions, the parameters used to calculate the analytical model are considered accurate. If the analytical model is formulated using a numerical method, a comparison of the model to the data can be difficult due to dispersion properties of the materials. These methods do not take into account large compressive forces.

In the prior art, some efforts have been made to measure material properties under large pressures. These methods consist of placing materials in pressurized settings, insonifying them, and then measuring their response. These methods are difficult because they have to be conducted under great atmospheric pressure that can adversely affect the instrumentation. Safety issues can also arise in connection with laboratory testing at extreme pressures. Finally, a mass loaded long thin rod has been studied with respect to the bar wavespeed and corresponding Young's modulus; however, this work does not investigate shear motion.

Accordingly, there is a need for a method of measuring mechanical properties of slab-shaped materials placed under pressure.

SUMMARY OF THE INVENTION

Accordingly, in this invention, a method to measure the complex frequency-dependent dilatational and shear wavenumbers of a material under a static compressional force is provided. The material is first vibrated in both vertical and horizontal directions while obtaining transfer functions in each direction. The two transfer functions are combined with a theoretical model to estimate a dilatational wavenumber and a shear wavenumber. The wavenumbers can be combined to give the complex dilatational wavespeed, complex shear wavespeed, complex Lamé constants, complex Young's modulus, complex shear modulus, and complex Poisson's ratio.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
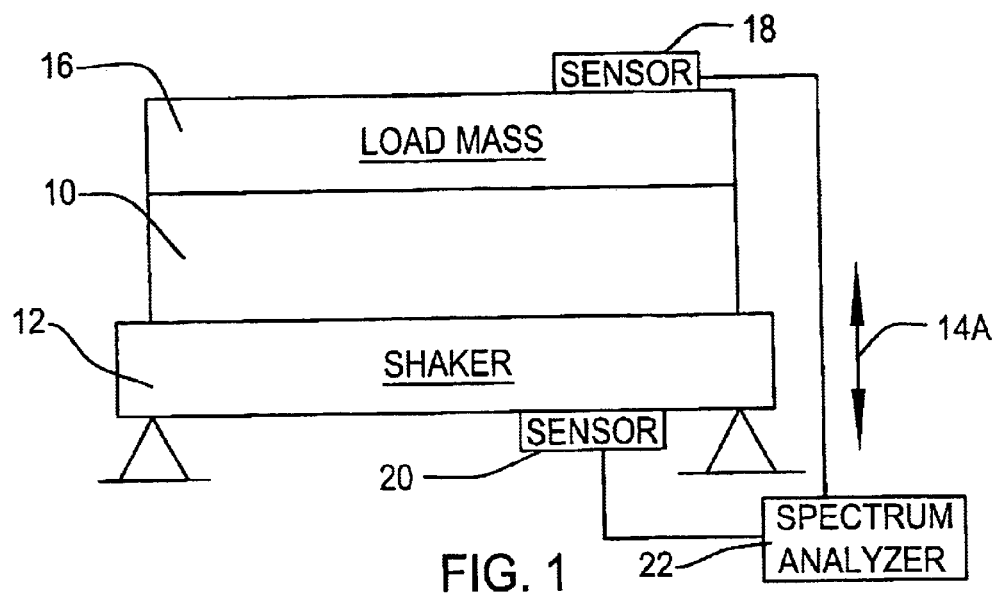
FIG. 1 shows apparatus for measurement of transfer functions in a vertical direction according to the current invention.
Figure 2:
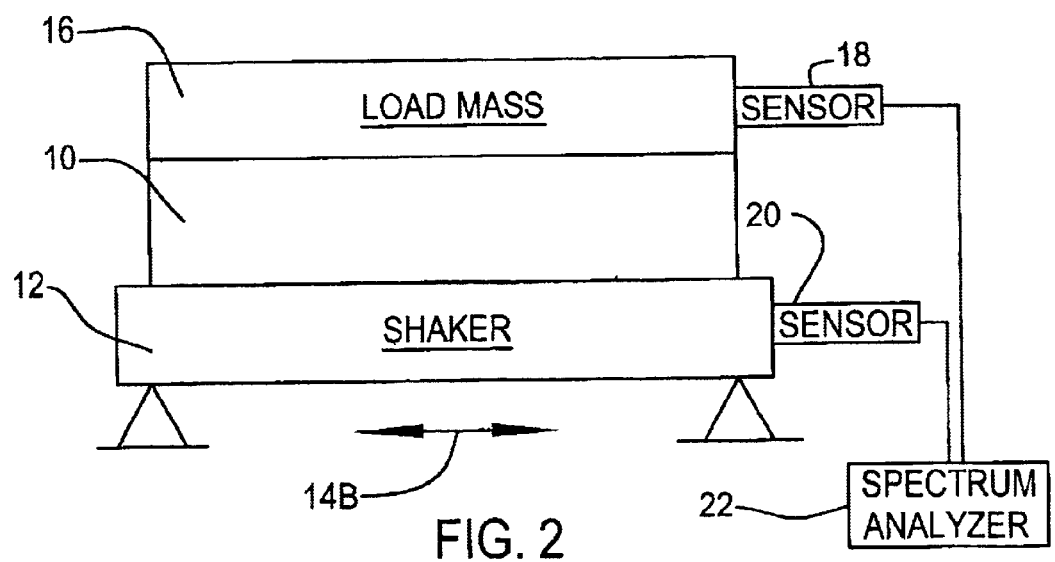
FIG. 2 shows apparatus for measurement of transfer functions in a horizontal direction according to the current invention.

The test procedure consists of vibrating a mass-loaded, slab-shaped test specimen 10 with a shaker 12 in two different directions, vertical 14A and horizontal 14B, as shown in FIGS. 1 and 2, respectively. It is noted that the load mass 16 attached to the top of the test specimen 10 must be sufficiently stiffer than the specimen 10 that it can be modeled as lumped parameter expression rather than a continuous media system. A typical example would be a steel load mass 16 attached above a rubber-like material test specimen 10. This example results in a ratio between the two stiffnesses of greater than 100. Lower ratios result in less accurate estimations. Vibrating the combined specimen 10 and load mass 16 causes different waveforms to propagate in the specimen 10. The inverse method developed here allows for the data from the experiments to be manipulated so that the complex dilatational and shear wavenumbers can be measured for the specimen 10. This test is usually done at multiple frequencies (swept sine) so any frequency dependencies can be identified and measured. Input vibration data is collected from the shaker 12. A sensor 18 is mounted on load mass 16 and another sensor 20 is mounted on shaker 12 for collecting transfer function data. In FIG. 1, the test is set up for monitoring the vertical transfer function. FIG. 2 shows the test as set up for monitoring the horizontal transfer function. Sensors 18 and 20 should be oriented properly to capture the motion being measured. Other test configurations using directions other than vertical and horizontal are possible; however, the test setups shown are preferred for ease of set up and calculation. These sensors 18 can be either accelerometers that record accelerations, or laser velocimeters that record velocities. In the swept sine mode, transfer functions of acceleration divided by acceleration or velocity divided by velocity are both equal to displacement divided by displacement. The time domain data collected from the sensors 18 and 20 are Fourier transformed into the frequency domain and then recorded as complex transfer functions, typically using a spectrum analyzer 22.

The motion of the test specimen shown in FIGS. 1 and 2 is governed by the equation:

$$\mu \nabla^2 u + (\lambda + \mu) \nabla \nabla \cdot u = \rho \frac{\partial^2 u}{\partial t^2}, \tag{1}$$

where $\lambda$ and $\mu$ are the complex Lamé constants (N/m$^2$);
  $\rho$ is the density (kg/m$^3$);
  t is time (s);
  · denotes a vector dot product; and
  u is the Cartesian coordinate displacement vector of the material.

Figure 3:
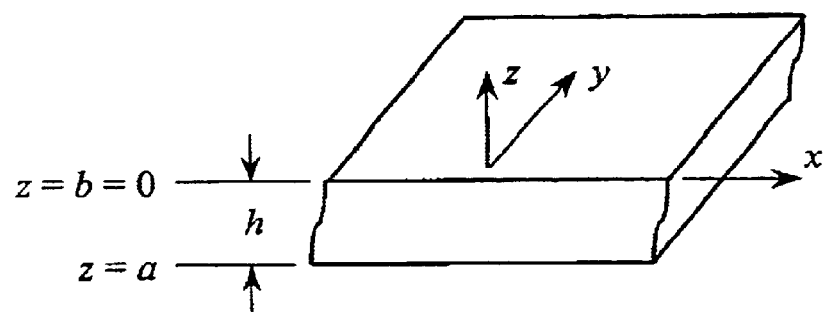
FIG. 3 is a diagram of the coordinate system of used with a test specimen in the model.

The coordinate system of the test configuration is shown in FIG. 3. Note that using this orientation results in b=0 and a having a value less than zero. The thickness of the specimen, h, is a positive value. Equation (1) is manipulated by writing the displacement vector u as $$u = \begin{Bmatrix} u_x(x, y, z, t) \\ u_y(x, y, z, t) \\ u_z(x, y, z, t) \end{Bmatrix}, \tag{2}$$

where x is the location along the plate (m), y is the location into the plate (m), and z is the location normal to the plate (m), as shown in FIG. 3. The symbol $\nabla$ is the gradient vector differential operator written in three-dimensional Cartesian coordinates as $$\nabla = \frac{\partial}{\partial x} i_x + \frac{\partial}{\partial y} i_y + \frac{\partial}{\partial z} i_z, \tag{3}$$

with $i_x$ denoting the unit vector in the x-direction, $i_y$ denoting the unit vector in the y-direction, and $i_z$ denoting the unit vector in the z-direction; $\nabla^2$ is the three-dimensional Laplace operator operating on vector u as $$\nabla^2 = \nabla^2 u_x i_x = \nabla^2 u_y i_y = \nabla^2 u_z i_z, \tag{4}$$

and operating on scalar u as $$\nabla^2 u_{x,y,z} = \nabla \cdot \nabla u_{x,y,z} = \frac{\partial^2 u_{x,y,z}}{\partial x^2} + \frac{\partial^2 u_{x,y,z}}{\partial y^2} + \frac{\partial^2 u_{x,y,z}}{\partial z^2}; \tag{5}$$

and the term $\nabla \cdot u$ is called the divergence and is equal to $$\nabla \cdot u = \frac{\partial u_x}{\partial x} + \frac{\partial u_y}{\partial y} + \frac{\partial u_z}{\partial z}. \tag{6}$$

The displacement vector u is written as $$u = \nabla \phi + \nabla \times \overline{\psi}, \tag{7}$$

where $\phi$ is a dilatational scalar potential, ×denotes a vector cross product, and $\overline{\psi}$ is an equivoluminal vector potential expressed as $$\vec{\psi} = \begin{Bmatrix} \psi_x(x, y, z, t) \\ \psi_y(x, y, z, t) \\ \psi_z(x, y, z, t) \end{Bmatrix}. \tag{8}$$

The problem is formulated as a two-dimensional system, thus y=0, $u_y(x,y,z,t)$=0, and $\partial(\cdot)/\partial y \equiv 0$. Expanding equation (7) and breaking the displacement vector into its individual nonzero terms yields $$u_x(x, z, t) = \frac{\partial \phi(x, z, t)}{\partial x} - \frac{\partial \psi_y(x, z, t)}{\partial z} \tag{9}$$

and $$u_z(x, z, t) = \frac{\partial \phi(x, z, t)}{\partial z} + \frac{\partial \psi_y(x, z, t)}{\partial x}. \tag{10}$$

Equations (9) and (10) are next inserted into equation (1), which results in $$c_d^2 \nabla^2 \phi(x, z, t) = \frac{\partial^2 \phi(x, z, t)}{\partial t^2} \tag{11}$$

and $$c_s^2 \nabla^2 \psi_y(x, z, t) = \frac{\partial^2 \psi_y(x, z, t)}{\partial t^2} \tag{12}$$

where equation (11) corresponds to the dilatational component and equation (12) corresponds to the shear component of the displacement field. Correspondingly, the constants $c_d$ and $c_s$ are the complex dilatational and shear wave speeds, respectively, and are determined by $$c_d = \sqrt{\frac{\lambda + 2\mu}{\rho}} \tag{13}$$

and $$c_s = \sqrt{\frac{\mu}{\rho}}. \quad (14)$$

The relationship of the Lamé constants to the Young's and shear moduli is shown as $$\lambda = \frac{E\upsilon}{(1+\upsilon)(1-2\upsilon)} \quad (15)$$

and $$\mu = G = \frac{E}{2(1+\upsilon)}, \quad (16)$$

where E is the complex Young's modulus (N/m$^2$), G is the complex shear modulus (N/m$^2$), and $\upsilon$ is the Poisson's ratio of the material (dimensionless).

The conditions of infinite length and steady-state response are now imposed, allowing the scalar and vector potential to be written as $$\phi(x,z,t) = \Phi(z)\exp(ikx)\exp(i\omega t) \quad (17)$$

and $$\psi_y(x,z,t) = \psi(z)\exp(ikx)\exp(i\omega t) \quad (18)$$

where i is the square root of −1, $\omega$ is frequency (rad/s), and k is wavenumber with respect to the x axis (rad/m). Inserting equation (17) into equation (11) yields $$\frac{d^2\Phi(z)}{dz^2} + \alpha^2\Phi(z) = 0, \quad (19)$$

where $$\alpha = \sqrt{k_d^2 - k^2}, \quad (20)$$

and $$k_d = \frac{\omega}{c_d}. \quad (21)$$

Inserting equation (18) into equation (12) yields.

$$\frac{d^2\Psi(z)}{dz^2} + \beta^2\Psi(z) = 0, \quad (22)$$

where $$\beta = \sqrt{k_s^2 - k^2}, \quad (23)$$

and $$k_s = \frac{\omega}{c_s}. \quad (24)$$

The solution to equation (19) is $$\Phi(z) = A(k,\omega)\exp(i\beta z) + D(k,\omega)\exp(-i\alpha z) + B(k,\omega)\exp(-i\alpha z), \quad (25)$$

and the solution to equation (22) is $$\psi(z) = C(k,\omega)\exp(i\beta z) + D(k,\omega)\exp(-i\beta z), \quad (26)$$

where $A(k,\omega)$, $B(k,\omega)$, $C(k,\omega)$, and $D(k,\omega)$ are wave response coefficients that are determined below. The displacements can now be written as functions of the unknown constants using the expressions in equations (9) and (10). They are $$u_z(x, z, t) = U_z(k, z, \omega)\exp(ikx)\exp(i\omega t) \quad (27)$$
$$= \{i\alpha[A(k, \omega)\exp(i\alpha z) - B(k, \omega)\exp(-i\alpha z)] +$$
$$ik[C(k, \omega)\exp(i\beta z) +$$
$$D(k, \omega)\exp(-i\beta z)]\}\exp(ikx)\exp(i\omega t),$$

and $$u_x(x, z, t) = U_x(k, z, \omega)\exp(ikx)\exp(i\omega t) \quad (28)$$
$$= \{ik[A(k, \omega)\exp(i\alpha z) + B(k, \omega)\exp(-i\alpha z)] -$$
$$i\beta[C(k, \omega)\exp(i\beta z) -$$
$$D(k, \omega)\exp(-i\beta z)]\}\exp(ikx)\exp(i\omega t).$$

Specific boundary conditions are now needed to individually solve for the case of vertical and horizontal motion. These are formulated separately below.

For the case of vertical motion, the base at z=a is vibrated vertically using a shaker, as shown in FIG. 1. Four boundary conditions are necessary to formulate this problem. Because the mass is attached to the material, the tangential (horizontal) motion at the top of the plate (z=b) is zero and this equation is written as $$u_x(x,b,t) = 0. \quad (29)$$

The normal stress at the top of the specimen is equal to and opposite the load created by the mass in the z direction. This expression is $$\tau_{zz}(x, b, t) = (\lambda + 2\mu)\frac{\partial u_z(x, b, t)}{\partial z} + \lambda\frac{\partial u_x(x, b, t)}{\partial x} = -M\frac{\partial^2 u_z(x, b, t)}{\partial t^2}, \quad (30)$$

where M is mass per unit area (kg/m$^2$) of the attached mass. The tangential motion at the bottom of the plate (z=a) is zero and this equation is written as $$u_x(x,a,t) = 0. \quad (31)$$

and the normal motion at the bottom of the plate is prescribed as a system input. This expression is $$u_z(x,a,t) = U_0 \exp(i\omega t). \quad (32)$$

Assembling equations (1)–(32) and letting b=0 yields the four-by-four system of linear equations that model the system. They are $$Ax = b, \quad (33)$$

where the entries of equation (33) are $$A_{11} = ik, \quad (34)$$

$$A_{12} = A_{11}, \quad (35)$$

$$A_{13} = -i\beta, \quad (36)$$

$$A_{14} = A_{13}, \quad (37)$$

$$A_{21} = -\alpha^2\lambda - 2\alpha^2 - \lambda k^2 - iM\omega^2\alpha, \quad (38)$$

$$A_{22} = -\alpha^2\lambda - 2\alpha^2 - \lambda k^2 - iM\omega^2\alpha, \quad (39)$$

$$A_{23} = -2k\beta\mu - iM\omega^2 k, \quad (40)$$

$$A_{24} = -2k\beta\mu - iM\omega^2 k, \quad (41)$$

$$A_{31} = A_{11} \exp(i\alpha a) \quad (42)$$

$$A_{32} = A_{11} \exp(-i\alpha a) \quad (43)$$

$$A_{33} = A_{13} \exp(i\beta a), \quad (44)$$

$$A_{34} = A_{13} \exp(-i\beta a), \quad (45)$$

$$A_{41} = i\alpha \exp(i\alpha a), \quad (46)$$

$$A_{42} = i\alpha \exp(-i\beta a), \quad (47)$$

$$A_{43} = ik \exp(i\beta a), \quad (48)$$

$$A_{44} = ik \exp(-i\beta a), \quad (49)$$

$$x_{11} = A(k,\omega), \quad (50)$$

$$x_{21} = B(k,\omega), \quad (51)$$

$$x_{31} = C(k,\omega), \quad (52)$$

$$x_{41} = D(k,\omega), \quad (53)$$

$$b_{11} = 0, \quad (54)$$

$$b_{21} = 0, \quad (55)$$

$$b_{31} = 0, \quad (56)$$

and $$b_{41} = U_0, \quad (57)$$

Using equations (34)–(57) the solution to the constants $A(k,\omega)$, $B(k,\omega)$, $C(k,\omega)$, and $D(k,\omega)$ can be calculated at each specific wavenumber and frequency using $$x = A^{-1}b. \quad (58)$$

Noting that for vertical motion, k=0, and using the coefficients from equation (58), the transfer function between the vertical base displacement and the vertical mass displacement can be written as $$T_1(\omega) = \frac{1}{R_1(\omega)} = \frac{U_z(0, b, \omega)}{U_0} = \frac{1}{\cos(k_d h) - \left(\frac{M}{\rho}\right)k_d \sin(k_d h)}, \quad (59)$$

where $T_1(\omega)$ or $R_1(\omega)$ correspond to the data from the vertical motion experiment.

The next step is to solve the inverse problem for vertical motion. This involves using the experimental data and equation (59) to estimate the dilatational wavenumber. Equation (59) can be rewritten as $$f(k_d) = 0 = \cos(k_d h) - \left(\frac{M}{\rho}\right)k_d \sin(k_d h) - R_1 \quad (60)$$

where the problem now becomes finding the zeros of the right-hand side of equation (60), or, in the presence of actual data that contains noise, finding the relative minima of the right-hand side of equation (60) and determining which relative minimum corresponds to dilatational wave propagation and which relative minima are extraneous. Because equation (60) has a number of relative minima, zero finding algorithms are not applied to this function, as they typically do not find all of the minima locations and are highly dependent on initial starting locations. The best method to find all of the minima locations is by plotting the absolute value of the right-hand side of equation (60) as a surface with the real part of dilatational wavenumber $k_d$ on one axis and the imaginary part of $k_d$ on the other axis. In order to do this, the user should start at a low frequency where the aliasing minimum has not yet appeared. In the specific example shown herein, this is below 3850 Hz for the dilatational wave and below 1550 Hz for the shear wave. At these lower frequencies, the minimum furthest to the left will correspond to dilatational wave propagation. As the frequency increases, extraneous minima will appear to the left of the minimum that corresponds to dilatational wave propagation, however, the wave propagation minimum will always be close to the previous test frequency wave propagation minimum provided that the frequency increments are relatively small. At a resolution of 0.5 rad/m for the materials in the example herein, this requires a frequency increment of 37.3 Hz for the dilatational measurement and 14.4 Hz for the shear measurement. Different test specimens and top masses require different increments. Additionally, the real part of the wavenumber is a monotonically increasing function with respect to frequency, so at each increase in frequency, the new wavenumber to be estimated has to be greater than the old wavenumber that was previously estimated. This process is further illustrated as related to the discussion concerning FIG. 6 and FIG. 7 below.

For the case of horizontal motion, the base at z=a is vibrated horizontally using a shaker, as shown in FIG. 2. Four boundary conditions are necessary to formulate this problem. Because the mass is attached to the material, the shear (tangential) stress at the top of the plate is equal to opposite the load created by the mass in the x direction. This expression is $$\tau_{zx}(x, b, t) = \mu\left[\frac{\partial u_x(x, b, t)}{\partial z} + \frac{\partial u_z(x, b, t)}{\partial x}\right] = -M\frac{\partial^2 u_x(x, b, t)}{\partial t^2}, \quad (61)$$

where M is mass per unit area (kg/m$^2$) of the attached mass. The normal motion at the top of the plate (z=b) is zero and this equation is written as $$u_z(x,b,t) = 0. \quad (62)$$

The tangential motion at the bottom of the plate (z=a) is prescribed as a system input and this equation is written as $$u_x(x,a,t) = V_0 \exp(i\omega t). \quad (63)$$

and the normal motion at the bottom of the plate is zero. This expression is $$u_z(x,a,t) = 0. \quad (64)$$

Assembling equations (1)–(28) and (62)–(64) and letting b=0 yields the four-by-four system of linear equations that model the system. They are $$Ax = b, \quad (65)$$

where the entries of equation (61) are $$A_{11} = -2\mu k\alpha - i\omega^2 Mk, \quad (66)$$

$$A_{12} = -2\mu k\alpha - i\omega^2 Mk, \quad (67)$$

$$A_{13} = \mu\beta^2 - \mu k_2 + i\omega^2 M\beta, \quad (68)$$

$$A_{14} = \mu\beta^2 - \mu k_2 - i\omega^2 M\beta, \quad (69)$$

$$A_{21} = i\alpha, \quad (70)$$

$$A_{22} = -A_{21}, \quad (71)$$

$$A_{23} = ik, \quad (72)$$

$$A_{24} = A_{23}, \quad (73)$$

$$A_{31} = A_{23} \exp(i\alpha a), \quad (74)$$

$$A_{32} = A_{23} \exp(-i\alpha a), \quad (75)$$

$$A_{33} = -i\beta \exp(i\beta a), \quad (76)$$

$$A_{34} = -i\beta \exp(-i\beta a), \quad (77)$$

$$A_{41} = A_{21} \exp(i\alpha a), \quad (78)$$

$$A_{41} = -A_{21} \exp(-i\alpha a), \quad (79)$$

$$A_{43} = A_{23} \exp(i\beta a), \quad (80)$$

$$A_{44} = A_{23} \exp(-i\beta a), \quad (81)$$

$$x_{11} = A(k,\omega), \quad (82)$$

$$x_{21} = B(k,\omega), \quad (83)$$

$$x_{31} = C(k,\omega), \quad (84)$$

$$x_{41} = D(k,\omega), \quad (85)$$

$$b_{11} = 0, \quad (86)$$

$$b_{21} = 0, \quad (87)$$

$$b_{31} = V_0, \quad (88)$$

and $$b_{41} = 0. \quad (89)$$

Using equations (67)–(89) the solution to the constants $A(k,\omega)$, $B(k,\omega)$, $C(k,\omega)$, and $D(k,\omega)$ can be calculated at each specific wavenumber and frequency using $$x = A^{-1}b. \quad (90)$$

Noting that for horizontal motion, k=0, and using the coefficients from equation (90), the transfer function between the horizontal base displacement and the horizontal mass displacement can be written as $$T_2(\omega) = \frac{1}{R_2(\omega)} = \frac{U_x(0, b, \omega)}{V_0} = \frac{1}{\cos(k_s h) - \left(\frac{M}{\rho}\right) k_s \sin(k_s h)}. \quad (91)$$

where $T_2(\omega)$ or $R_2(\omega)$ correspond to the data from the horizontal motion experiment.

The next step is to solve the inverse problem for horizontal motion. This involves using the data and equation (91) to estimate the shear wavenumber. Equation (91) can be rewritten as $$f(k_s) = 0 = \cos(k_s h) - \left(\frac{M}{\rho}\right) k_s \sin(k_s h) - R_2. \quad (92)$$

It is noted that this equation is identical, except for the subscripts, to equation (60). The shear wavenumber is estimated using the same procedure that was used to estimate the dilatational wavenumber above.

The material properties can be determined from the wavenumbers. First, the dilatational and shear wavespeeds are determined using $$c_d = \frac{\omega}{k_d} \quad (93)$$

and $$c_s = \frac{\omega}{k_s}, \quad (94)$$

respectively. The Lamé constants are calculated using equations (13) and (14) written as $$\mu = \rho c_s^2 \quad (95)$$

and $$\lambda = \rho c_d^2 - 2\rho c_s^2. \quad (96)$$

Poisson's ratio is then calculated using $$\upsilon = \frac{\lambda}{2(\mu + \lambda)}. \quad (97)$$

Young's modulus can be calculated with $$E = \frac{2\mu(2\mu + 3\lambda)}{2(\mu + \lambda)} \quad (98)$$

and the shear modulus can be determined using $$G = \mu. \quad (99)$$

Figure 4A:
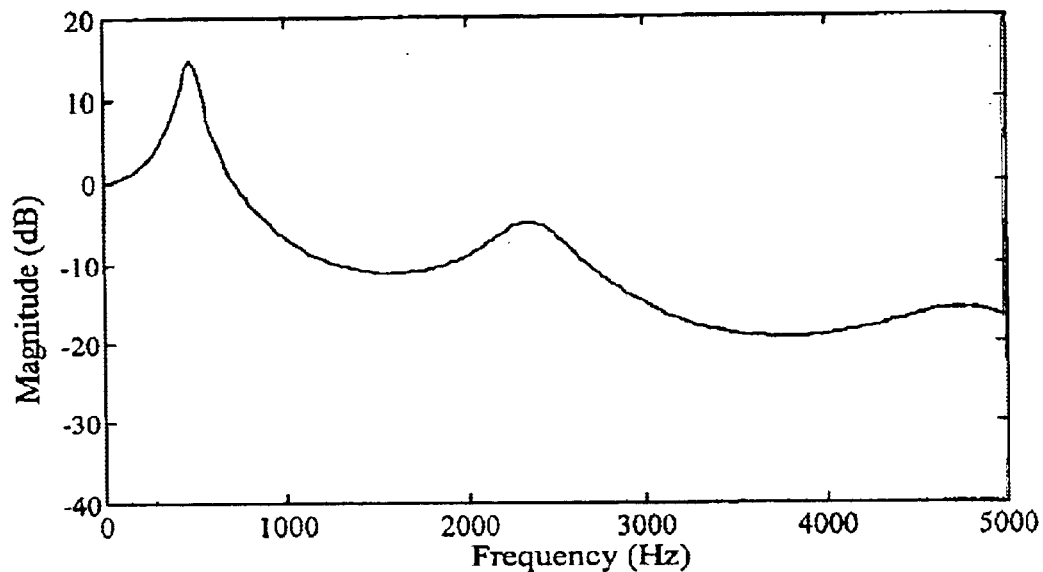
FIG. 4A is a plot of the transfer function magnitude versus input frequency for the vertical direction test.
Figure 4B:
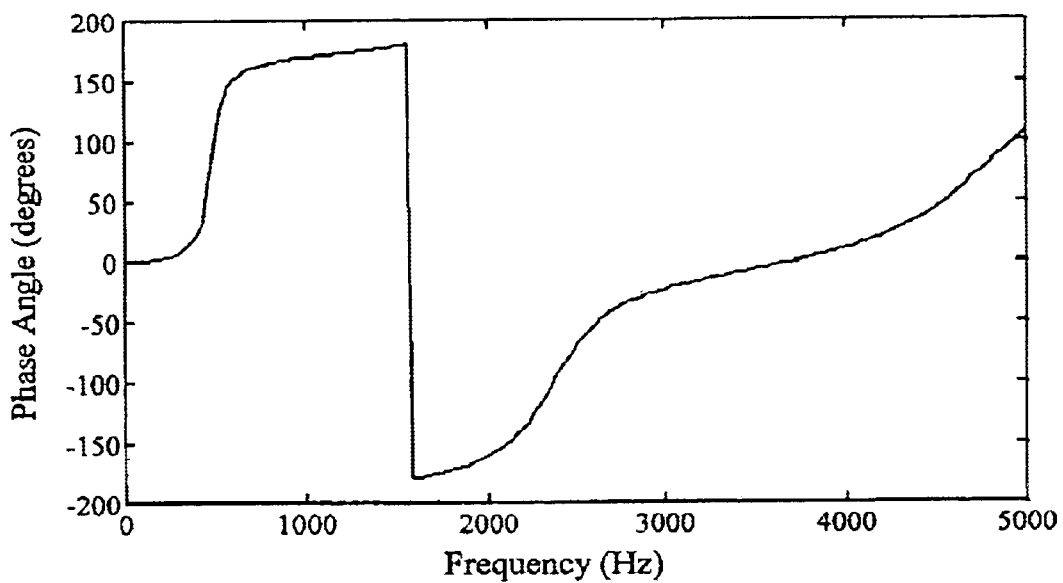
FIG. 4B is a plot of the transfer function phase angle versus input frequency for the vertical direction test.
Figure 5A:
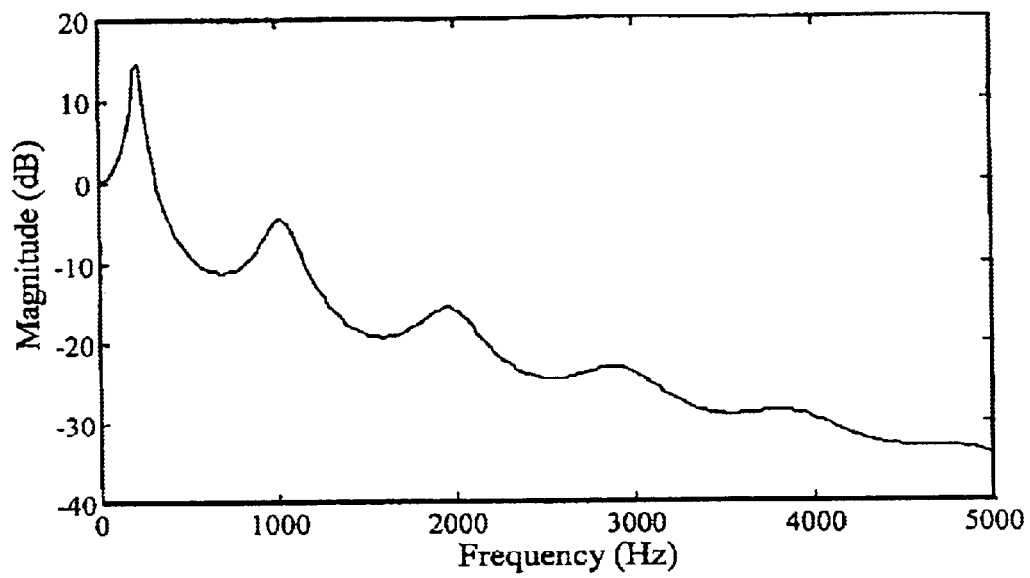
FIG. 5A is a plot of the transfer function magnitude versus input frequency for the horizontal direction test.
Figure 5B:
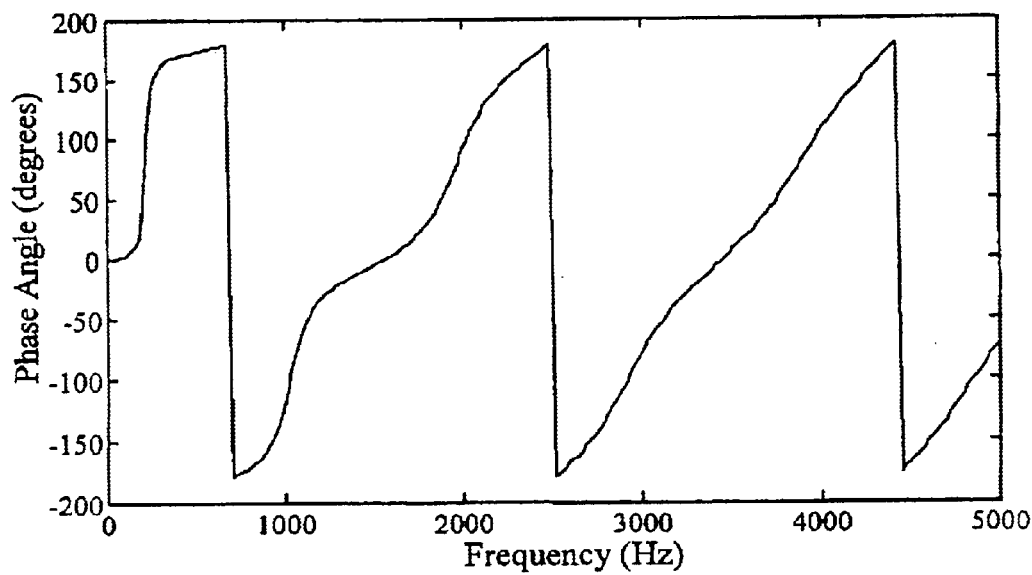
FIG. 5B is a plot of the transfer function phase angle versus input frequency for the horizontal direction test.

The above measurement method can be simulated by means of a numerical example. Soft rubber-like material properties of the test specimen are used in this simulation. The material has a Young's modulus E of $[(1e8-i2e7)+(5e3\int -i3e2\int)]$N/m$^2$ where f is frequency in Hz, Poisson's ratio v is equal to 0.40 (dimensionless), density ρ is equal to 1200 kg/m$^3$, and a thickness h of 0.1 m. The top mass is a 0.0254 m (1 inch) steel plate that has a mass per unit area value M of 199 kg/m$^2$. FIG. 4 is a plot of the transfer function of the system for vertical motion and corresponds to equation (59). FIG. 5 is a plot of the transfer function of the system for horizontal motion and corresponds to equation (91). In FIGS. 4 and 5, the top plot is the magnitude in decibels and the bottom plot is the phase angle in degrees.

Figure 6:
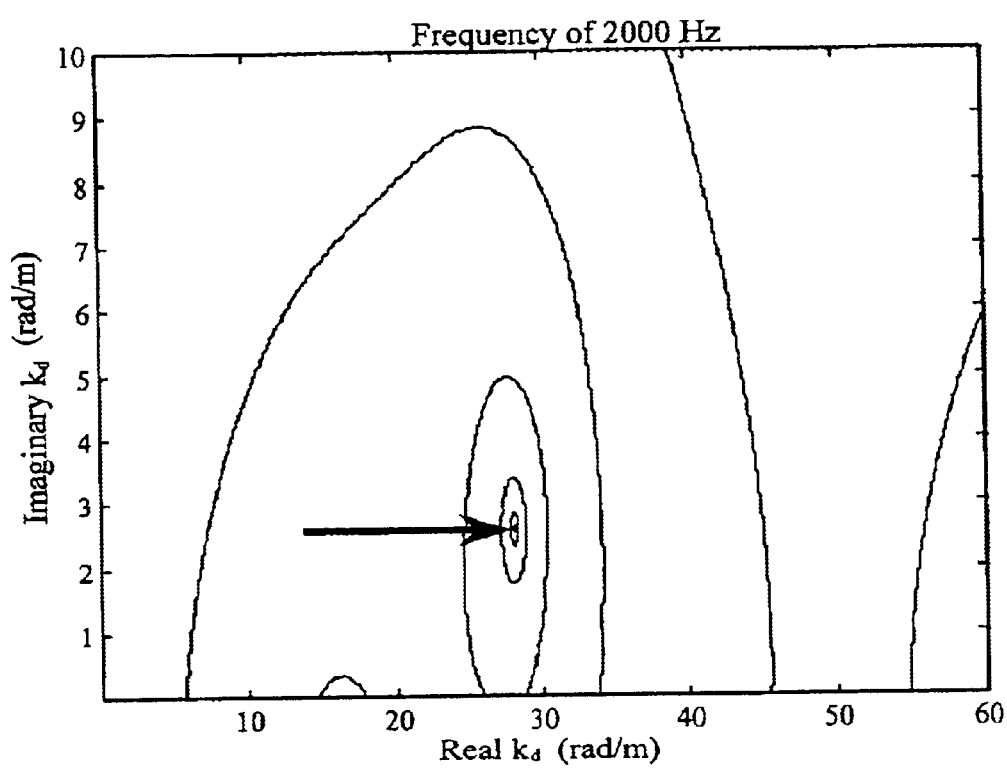
FIG. 6 is a contour plot of the absolute value of the dilatational wavenumber on an real-imaginary coordinate system of the dilatational wavenumbers at 2000 Hz.
Figure 7:
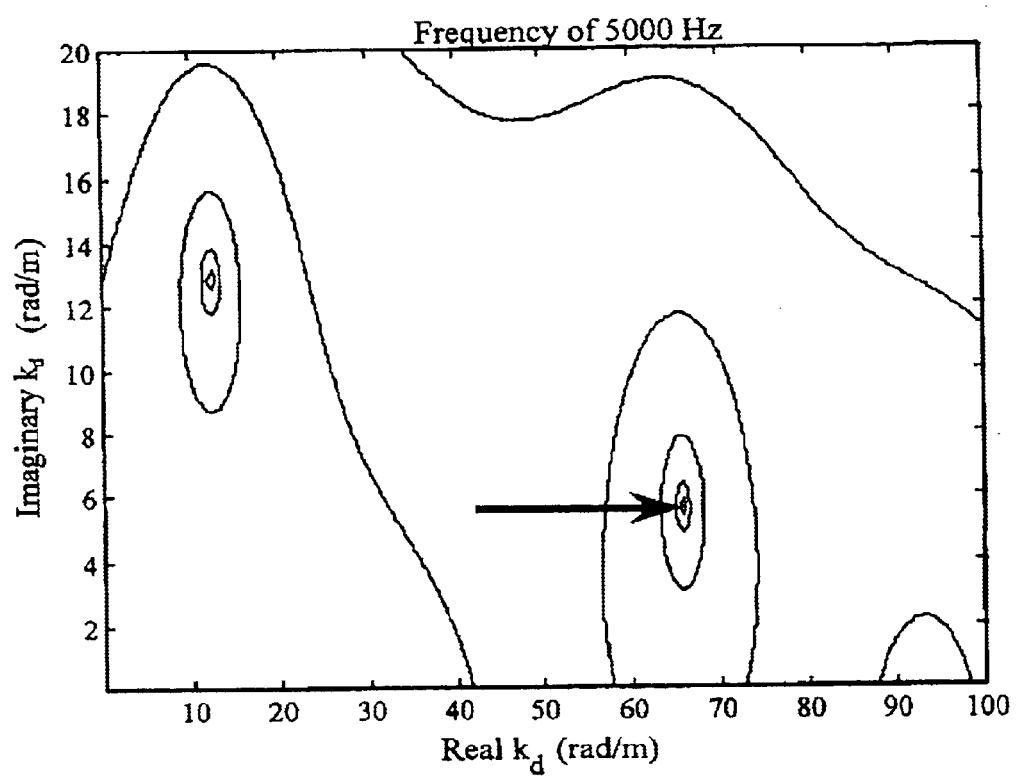
FIG. 7 is a contour plot of the absolute value of the dilatational wavenumber on an real-imaginary coordinate system of the dilatational wavenumbers at 5000 Hz.

FIG. 6 is a contour plot of the absolute value of equation (60) expressed in decibels versus real dilatational wavenumber on the x axis and imaginary dilatational wavenumber on the y axis at 2000 Hz. The estimated dilatational wavenumber, read directly from the plot at the location the minimum value appears and marked with an arrow, is 27.89+2.61i rad/m. The actual value of the dilatational wavenumber is 27.99+2.60i rad/m, which is slightly different from the estimated value due to the surface discretization of equation (60). FIG. 7 is a contour plot of equation (60) at 5000 Hz. At this frequency, an extraneous minimum appears on the left-hand side of the plot. However, because the real part of the wavenumber must be increasing with increasing frequency, the minimum corresponding to dilatational wave propagation is located at the arrow marked spot and is equal to 65.86+5.60i rad/m, as compared to an actual value of 65.77+5.62 i rad/m. Again, the difference between the two values can be attributed to the discretization of the surface.

Figure 8A:
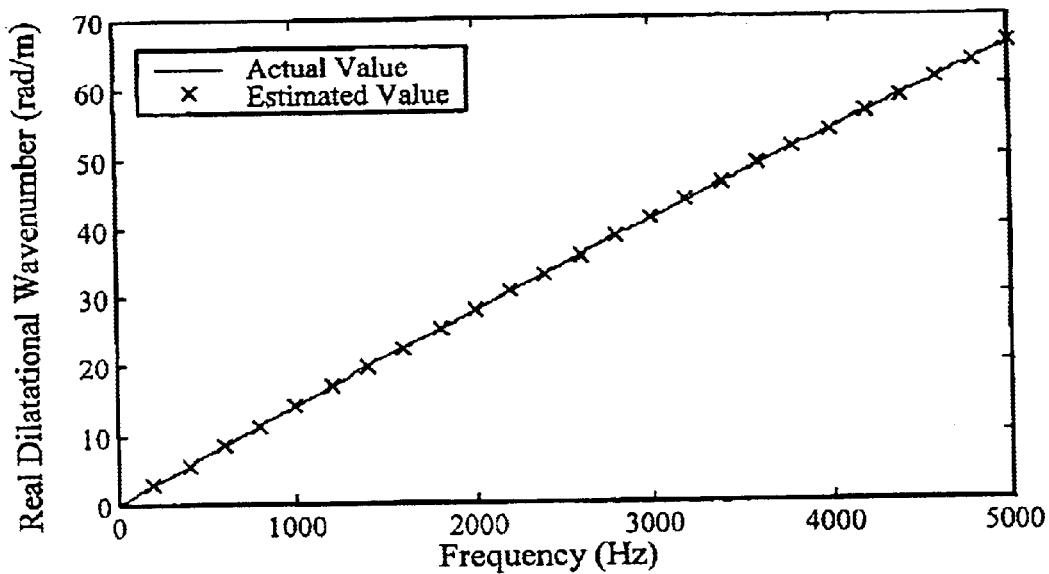
FIG. 8A is a plot of the real dilatational wavenumber versus frequency.
Figure 8B:
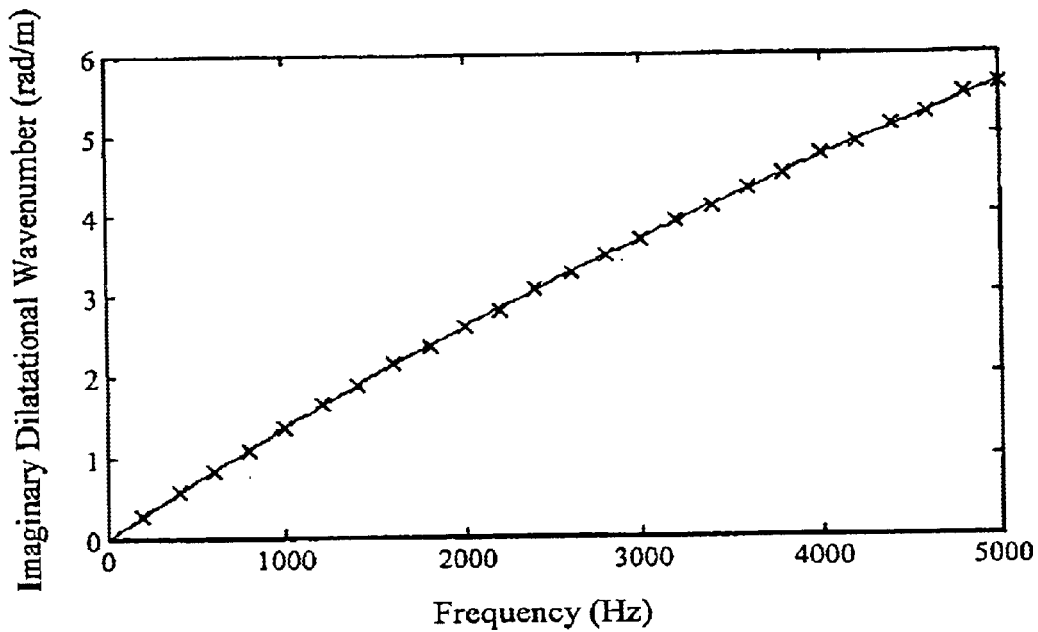
FIG. 8B is a plot of the imaginary dilatational wavenumber versus frequency.
Figure 9A:
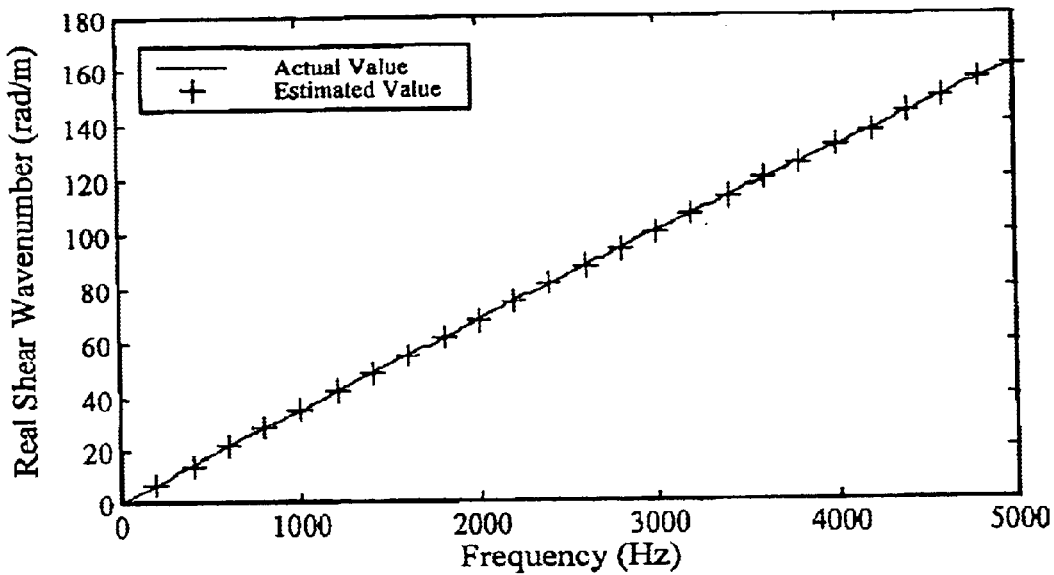
FIG. 9A is a plot of the real shear wavenumber versus frequency.
Figure 9B:
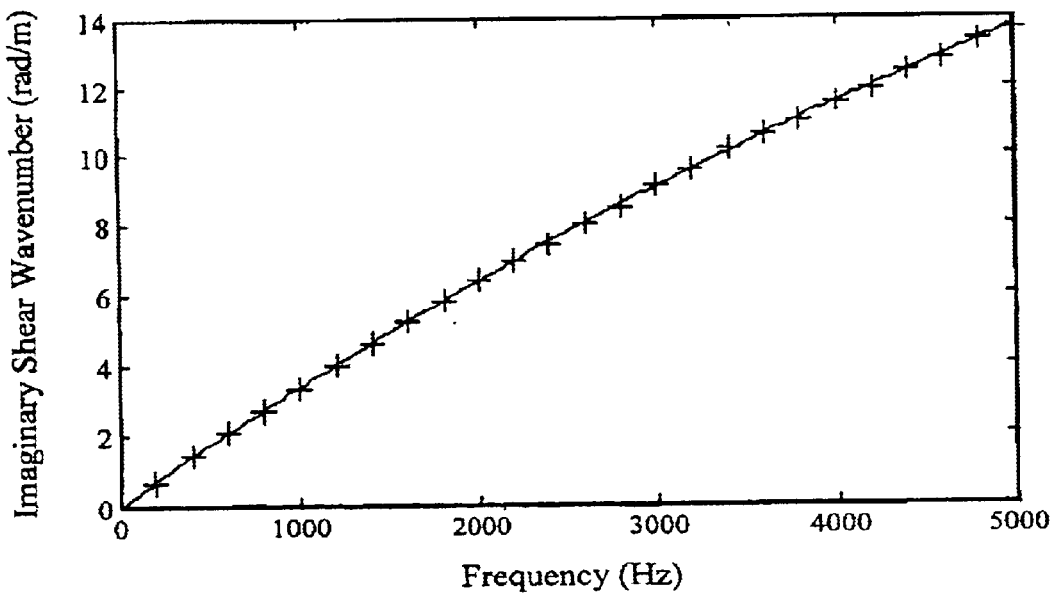
FIG. 9B is a plot of the imaginary shear wavenumber versus frequency.
Figure 10:
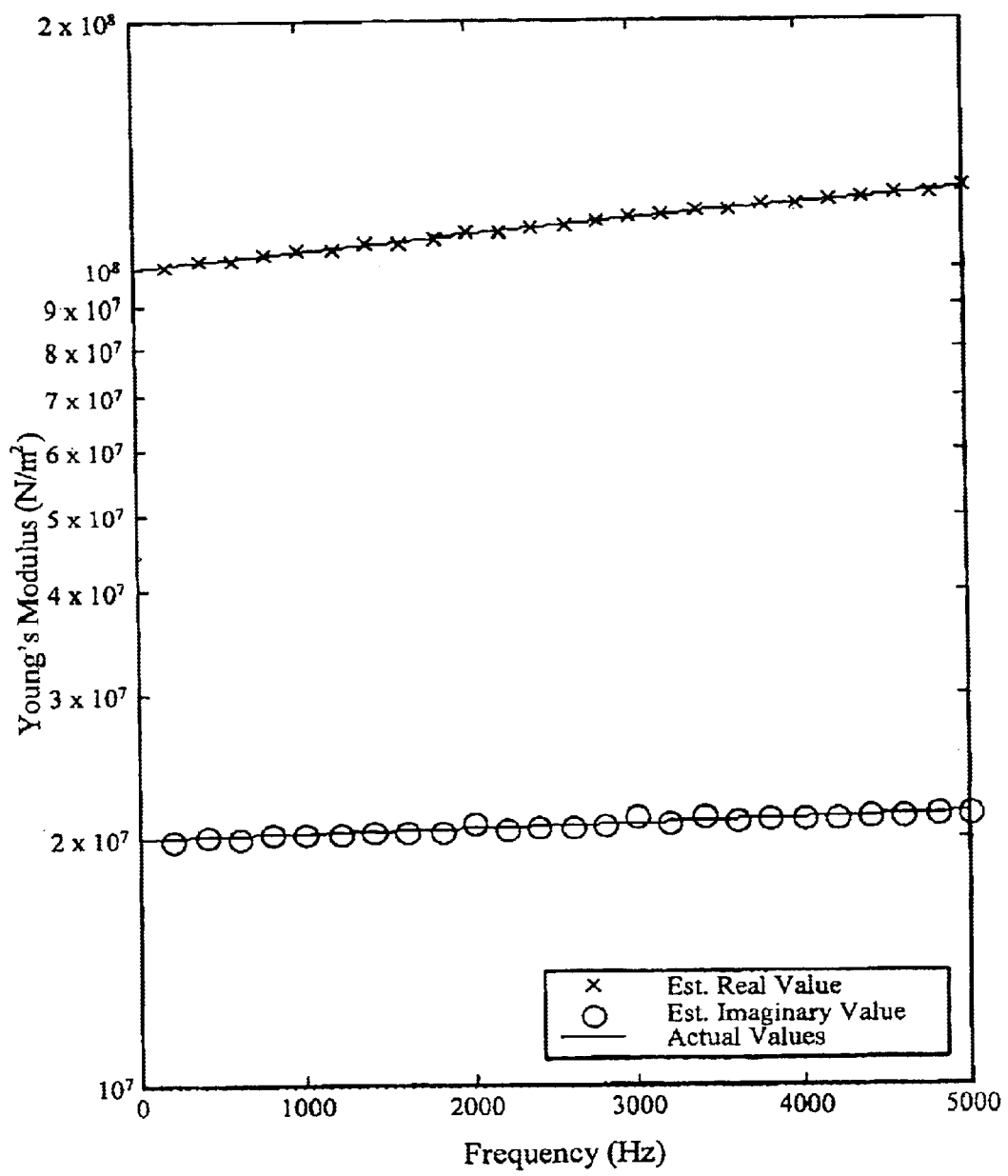
FIG. 10 is a plot of the real and imaginary Young's modulus versus frequency.
Figure 11:
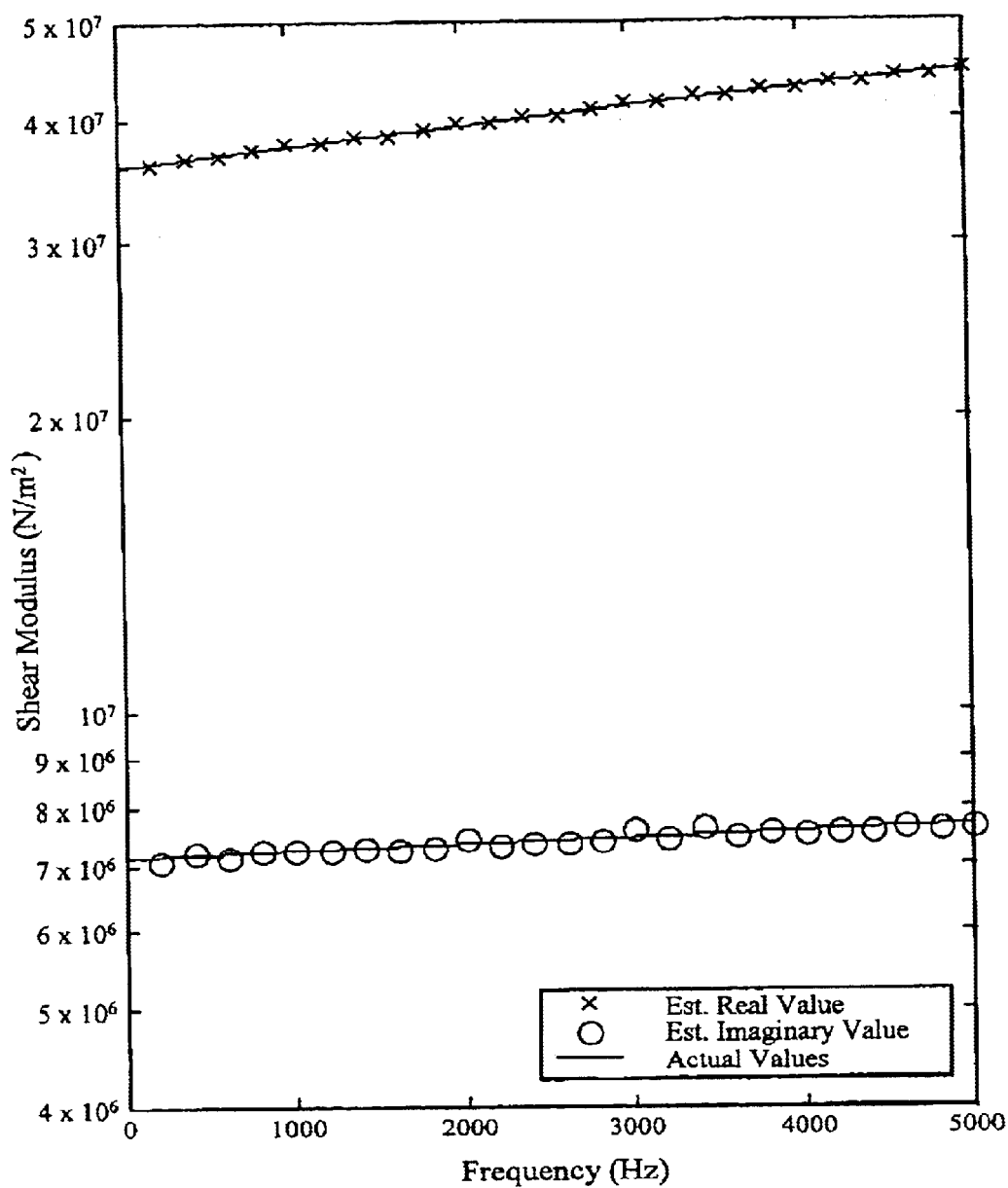
FIG. 11 is a plot of the real and imaginary shear modulus versus frequency.
Figure 12:
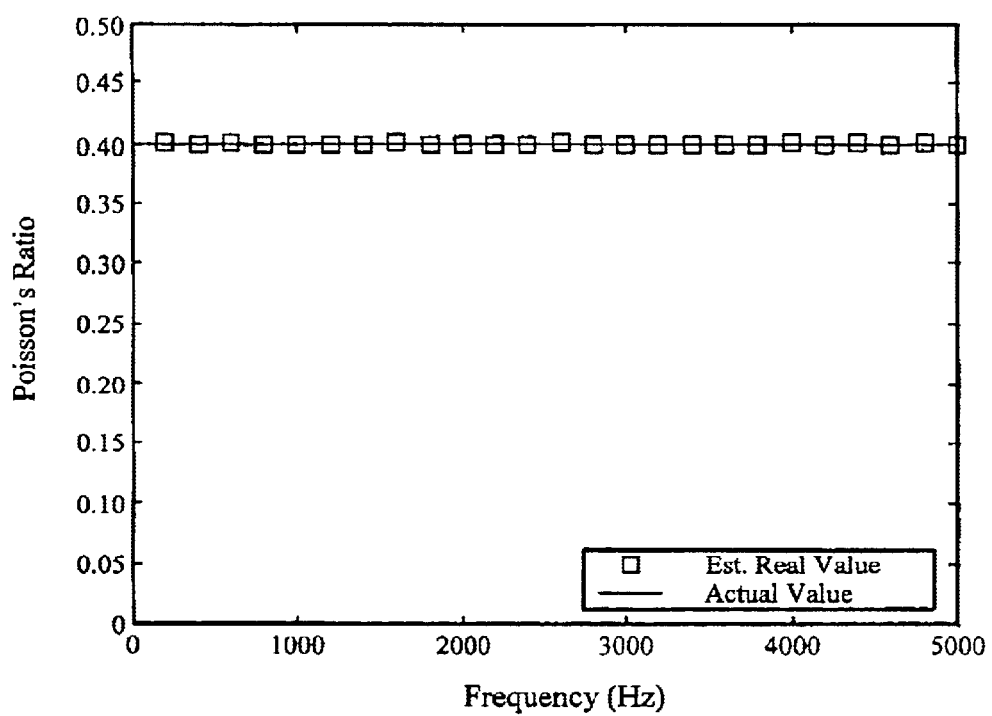
FIG. 12 is a plot of the Poisson's ratio versus frequency.

FIG. 8 is plot of actual (solid line) and estimated (x symbols) dilatational wavenumber versus frequency. FIG. 9 is plot of actual (solid line) and estimated (+symbols) shear wavenumber versus frequency. In FIGS. 8 and 9, the top plot is the real part of the wavenumber and the bottom part is the imaginary part of the wavenumber. FIG. 10 is a plot of actual (solid line) and estimated (real part—x symbols, imaginary part—o symbols) Young's modulus versus frequency. FIG. 11 is a plot of actual (solid line) and estimated (real part—x symbols, imaginary part—o symbols) shear modulus versus frequency. In FIGS. 10 and 11, the imaginary part of the modulus all have a negative sign but are depicted with positive signs for plotting purposes. FIG. 12 is a plot of actual (solid line) and estimated (square symbols) of the real part of Poisson's ratio versus frequency. Because the numerical example is formulated using a Poisson's ratio that is strictly real, no imaginary component is shown in this plot. Imaginary values of Poisson's ratio are possible and have been shown to theoretically exist.

This invention gives the ability to estimate complex dilatational and shear wavespeeds of a material that is slab-shaped and subjected to compressive forces. It also allows estimation of complex Lamé constants of a material that is slab-shaped and subjected to compressive forces. Complex Young's and shear moduli of a material that is slab-shaped and subjected to compressive forces can be estimated using this invention. The invention also allows estimation of the complex Poisson's ratio of a material that is slab-shaped and subjected to compressive forces. The advantage of this patent is that it does not require a testing configuration that has to be pressurized.

Obviously many modifications and variations of the present invention may become apparent in light of the above teachings. In light of the above, it is therefore understood that within the scope of the appended claims, the invention may be practiced otherwise than as specifically described.

What is claimed is:

1. A method to measure the complex frequency-dependent dilatational and shear wavenumbers of a material under a static compressional force comprising the steps of:

subjecting the material to a compressional load;

vibrating the material in a vertical direction at a range of test frequencies;

measuring a first set of material motion parameters for each frequency in the range while the material is vibrating in the vertical direction;

vibrating the material in a horizontal direction at the range of test frequencies;

measuring a second set of motion parameters for each frequency in the range while the material is vibrating in the horizontal direction;

obtaining a dilatational wavenumber by utilizing said measurement of motion parameters obtained while said material was vibrating in the vertical direction;

obtaining a shear wavenumber by utilizing said measurement of motion parameters obtained while said material was vibrating in the horizontal direction; and calculating material parameters from known material properties and a selected one of the shear wavenumber, dilatational wavenumber, and both wavenumbers at each test frequency.

2. The method of claim 1 wherein the steps of measuring a first set of motion parameters comprises mounting accelerometers on the material to measure the acceleration of the material away from the source of the vibration, the acceleration of the material being one motion parameter.

3. The method of claim 2 wherein the steps of measuring a second set of motion parameters comprises mounting accelerometers on the material to measure the acceleration of the material away from the source of the vibration, the acceleration of the material being one motion parameter.

4. The method of claim 1 wherein the steps of measuring a first set of motion parameters comprises mounting velocimeters on the material to measure the velocity of the material away from the source of the vibration, the velocity of the material being one motion parameter.

5. The method of claim 4 wherein the steps of measuring a second set of motion parameters comprises mounting velocimeters on the material to measure the velocity of the material away from the source of the vibration, the velocity of the material being one motion parameter.

6. The method of claim 1 wherein the step of calculating material parameters includes at least one parameter selected from complex dilatational wavespeed, complex shear wavespeed, complex Lamé constants, complex Young's modulus, complex shear modulus, and complex Poisson's ratio.

7. The method of claim 1 wherein said step of obtaining a dilatational wavenumber comprises:

plotting an absolute value of the difference between a predicted dilatational wavenumber and the first set of motion parameters on a real dilatational wavenumber versus imaginary dilatational wavenumber graph for each frequency starting at the lowest frequency of the range of test frequencies;

finding the values of the real dilatational wavenumber and imaginary dilatational wavenumber at each frequency that will result in a minimum for the difference between a predicted wavenumber and the first set of motion parameters; and identifying actual minima from the found values, said actual minima giving the complex dilatational wavenumber.

8. The method of claim 7 wherein the step of identifying actual minima comprises:

identifying the found value at the lowest frequency as an actual minimum;

changing the frequency to a higher frequency of said range of test frequencies; and identifying the found value closest to the previous actual minimum having a real dilatational wavenumber higher than that of the previous actual minimum as the actual minimum at that frequency.

9. The method of claim 1 wherein said step of obtaining a shear wavenumber comprises:

plotting an absolute value of the difference between a predicted shear wavenumber and the second set of motion parameters on a real shear wavenumber versus imaginary shear wavenumber graph for each frequency starting at the lowest frequency of the range of test frequencies;

finding the values of the real shear wavenumber and imaginary shear wavenumber at each frequency that will result in a minimum for the difference between a predicted wavenumber and the second set of motion parameters; and identifying actual minima from the found values, said actual minima giving the complex shear wavenumber.

10. The method of claim 9 wherein the step of identifying actual minima comprises:

identifying the found value at the lowest frequency as an actual minimum;

changing the frequency to a higher frequency of said range of test frequencies; and identifying the found value closest to the previous actual minimum having a real shear wavenumber higher than that of the previous actual minimum as the actual minimum at that frequency.

11. The method of claim 1 wherein said step of calculating material parameters comprises:

finding a complex dilatational wavespeed from the complex dilatational wavenumber;

finding a complex shear wavespeed from the complex shear wavenumber;

calculating Lamé constants from the complex shear wavespeed, complex dilatational wavespeed and the known material property of density; and calculating at least one of a complex Poisson's ratio and a complex Young's modulus from said calculated Lamé constants.

* * * * *